United States Patent Office.

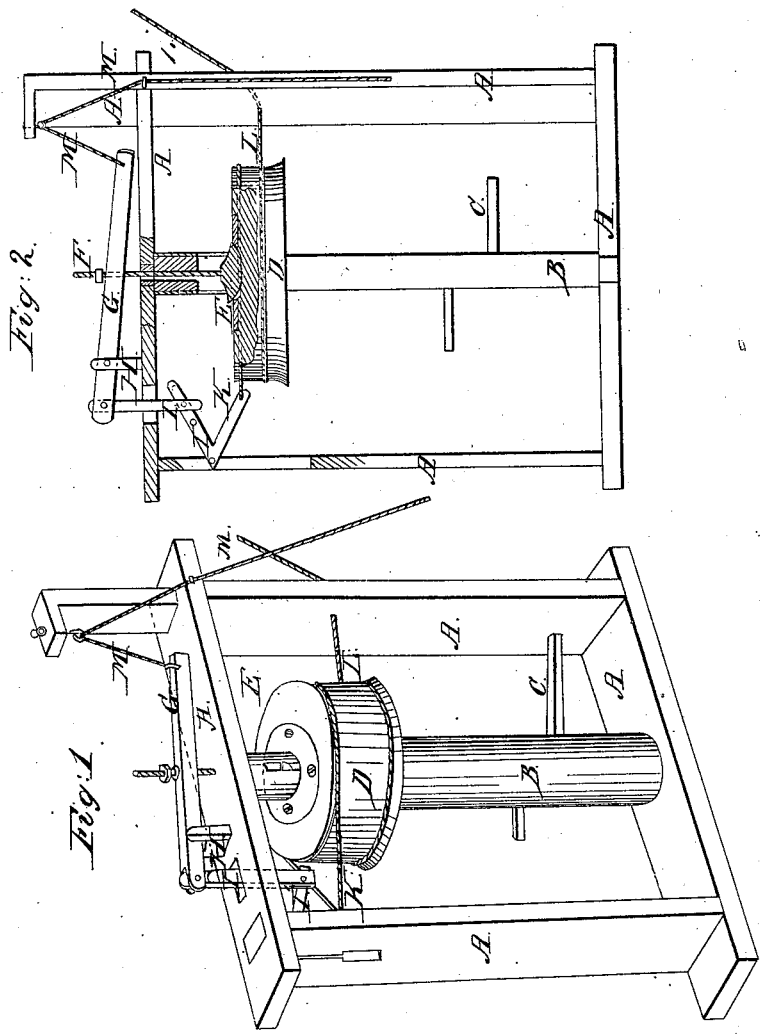

WILLIAM W. CRAPSTER, OF MECHANICSBURG, PENNSYLVANIA.

Letters Patent No. 81,256, dated August 18, 1868.

IMPROVED HOISTING-APPARATUS.

*The Schedule referred to in these Letters Patent and making part of the same.*

TO ALL WHOM IT MAY CONCERN:

Be it known that I, WILLIAM W. CRAPSTER, of Mechanicsburg, in the county of Cumberland, and State of Pennsylvania, have invented a new and useful Improvement in Hoisting-Apparatus; and I do hereby declare that the following is a full, clear, and exact description of the same, reference being had to the annexed drawings, making part of this specification, in which—

Figure 1 is a perspective view, and
Figure 2 is an elevation partly in section.

The same letters in all the figures indicate identical parts.

This invention relates to that class of hoisting-apparatus usually employed in stores and warehouses, but which is well adapted to discharging cargoes from vessels, and for various other purposes.

A is a frame of any suitable material, firmly joined together, and which may be fastened to the floor of the building or deck of a vessel where the apparatus is to be used.

B is a vertical shaft, having its bearings in the upper and lower cross-beams of the frame A, and carrying upon its upper end a drum, D, which is so constructed as to be capable of revolving freely upon said shaft, or of being connected therewith in such a manner that the two can only revolve together.

The connection between the shaft and the drum is effected by means of the clutch or dog E, which is operated by the rod F, which passes from the dog through the upper end of the shaft B, and connects with the lever G.

The above-named arrangement of parts is such that when the outer end of the lever G is raised, by pulling upon the cord M, the clutch or dog will be released from its seat in the plate upon the top side of the drum, and the drum will be free to revolve upon the shaft, but upon the return of the dog to its seat, the two can only revolve in unison.

C is a lever, fastened to the shaft B, near its lower end, to which a horse or other animal may be attached, for the purpose of giving motion to said shaft, or it may be driven in any other manner.

H is a fulcrum to the lever G, which is fast in the frame A, the lever being so placed therein that the short arm thereof extends outward, and receives the upper end of the connecting-bar I, the lower end of which is jointed to one arm of the bell-crank I', to the opposite arm of which a belt, chain, or rope, K', is attached, which passes around the drum, and which acts as a brake when lowering any weight which has been previously raised by the apparatus.

L is a rope or chain, made fast to the drum D, in such a manner that, as the drum revolves, the rope or chain will be wound around it, and any weight which may be attached to the opposite end of said chain will be raised or lowered, as occasion may require. The rope or chain, after leaving the drum, passes through the side of the frame A, and thence over any pulley or drum placed in any proper position for raising the desired weight.

M is a rope, fastened to the long arm of the lever G, which passes over a pulley in the frame A, for the purpose of raising the clutch or dog E out of its seat in the drum D, and at the same time tightening the brake-chain upon the drum D.

What I claim as my invention, and desire to secure by Letters Patent, is—

1. The combination of the drum D, shaft B, clutch or dog E, rod F, and lever G, for attaching the drum to the shaft, and detaching it therefrom, substantially as shown and described.

2. In combination with the above-named elements, the connecting-bar I, bell-crank I', and the belt or chain K, arranged substantially as shown and described.

In testimony whereof, I have signed my name to this specification in the presence of two subscribing witnesses.

WM. W. CRAPSTER.

Witnesses:
JOHN D. BLOOR,
JOHN S. HOLLINGSHEAD.